(12) United States Patent
Choi

(10) Patent No.: US 8,883,339 B2
(45) Date of Patent: Nov. 11, 2014

(54) ALKALI METAL-CATHODE SOLUTION BATTERY

(71) Applicant: University of Central Florida Research Foundation, Inc., Orlando, FL (US)

(72) Inventor: Pyoungho Choi, Winter Park, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 61 days.

(21) Appl. No.: 13/747,029

(22) Filed: Jan. 22, 2013

(65) Prior Publication Data

US 2013/0130085 A1    May 23, 2013

Related U.S. Application Data

(63) Continuation-in-part of application No. PCT/US2011/045048, filed on Jul. 22, 2011.

(60) Provisional application No. 61/366,577, filed on Jul. 22, 2010.

(51) Int. Cl.
*H01M 4/48* (2010.01)
*H01M 4/36* (2006.01)
*H01M 4/38* (2006.01)
*H01M 10/054* (2010.01)
*H01M 10/0585* (2010.01)

(52) U.S. Cl.
CPC ............... *H01M 4/364* (2013.01); *H01M 4/38* (2013.01); *H01M 4/381* (2013.01); *H01M 10/054* (2013.01); *H01M 10/0585* (2013.01)
USPC ........................ 429/105; 429/188; 429/321

(58) Field of Classification Search
USPC .......................................... 429/105, 188, 321
See application file for complete search history.

(56) References Cited

U.S. PATENT DOCUMENTS

| 6,022,637 | A | 2/2000 | Wilson |
| 6,447,958 | B1 | 9/2002 | Shinohara et al. |
| 2006/0019154 | A1 | 1/2006 | Imachi et al. |
| 2011/0200868 | A1* | 8/2011 | Klaassen ....................... 429/163 |

FOREIGN PATENT DOCUMENTS

| GB | 1503795 | 3/1978 |
| WO | 2010054305 | 5/2010 |

\* cited by examiner

*Primary Examiner* — Jane Rhee
(74) *Attorney, Agent, or Firm* — Jetter & Associates, P.A.

(57) ABSTRACT

An alkali metal-cathode solution storage battery includes an alkali metal anode including at least one alkali metal, a cathode including copper metal, and an alkali ion conducting electrolyte/separator separating the anode and cathode. An anode side electrolyte is between the anode and the separator, and a cathode side electrolyte is between the cathode and the separator. The cathode side electrolyte is selected to have capacity to dissolve metal ions from the alkali metal and electron conducting materials. An ion exchange reaction occurs during operation of the battery within the cathode side electrolyte. The battery can be operated at low temperature (i.e., <100° C.), and provide high specific energy density. The battery can be a planar battery arrangement.

12 Claims, 2 Drawing Sheets

Table: Comparison between NaCu battery vs NaS and Zebra batteries

| Battery | Anode | Cathode | T, °C | Potential, V | Specific Energy Density, Wh/kg | Safety Issue | Cost $/kWh | |
|---|---|---|---|---|---|---|---|---|
| Prior Art | Zebra | Na | NiCl₂ | 300 | 2.59 (NiCl₂) | 790 | Mild | 300~600 |
| Prior Art | NaS | Na | Sulfur | 350 | 2.076-1.74 | 760 | Serious | 450 |
| | Na-Cu | Na | Cu | 25 | 3.23(Cu⁺²) | 1493 | None | <100 |

FIG. 2

ALKALI METAL-CATHODE SOLUTION BATTERY

CROSS REFERENCE TO RELATED APPLICATIONS

This application is a continuation-in-part (CIP) of PCT Patent Application No. PCT/US11/45048 entitled "ALKALI METAL-COPPER STORAGE BATTERY" filed on Jul. 22, 2011, which claims the benefit of Provisional Application Ser. No. 61/366,577 entitled "ALKALI METAL-COPPER STORAGE BATTERY", filed Jul. 22, 2010, both of which are herein incorporated by reference in their entirety.

FIELD

Disclosed embodiments relate to alkali metal-(e.g., Na) based storage batteries.

BACKGROUND

A rechargeable battery or storage battery comprises one or more electrochemical cells. Rechargeable batteries are known as secondary cells because their electrochemical reactions are electrically reversible. Rechargeable batteries come in many different shapes and sizes, ranging anything from button cells to megawatt systems used to stabilize an electrical distribution network.

Large-scale non-mobile applications for secondary batteries include grid energy storage applications. Grid energy storage applications use rechargeable batteries for load leveling, where they store electric energy for use during peak load periods, and for renewable energy uses, such as for storing power generated from photovoltaic arrays during the day to be used at night.

A sodium-sulfur (NaS) battery is a type of molten metal battery comprising an elemental sodium anode and a sulfur cathode that is used for some grid energy applications. This battery has a solid electrolyte that uses an operating temperature around 300 to 350 ° C. to lower the electrical resistance through the solid electrolyte for sodium ions traveling back and forth between the anode and the cathode while the battery is in use. Since molten sulfur is not electrically conductive, a porous current collector, such as comprising graphite or a carbon felt matrix, is incorporated to provide a large surface area at which electrons are transferred from/to the sulfur cathode during the charge/discharge of the battery. This battery has a high energy density, high efficiency of charge/discharge (89-92%) and long cycle life, and is fabricated from inexpensive materials. Limitations of this battery include a high operating temperature that is between 300 to 350 ° C., and reliability problems due to the corrosive nature of sulfur.

A so-called "Zebra Battery" is another type of sodium-based battery that is used for grid energy applications. This battery has a solid electrolyte and an operating temperature around 300° C. to lower the resistance through the solid electrolyte for sodium ions. This battery uses molten sodium at the anode and a solid metal compound cathode comprising $NiCl_2$ or $FeCl_2$. The theoretical specific energy of this battery is slightly higher than that of the NaS battery (790 Wh/kg vs. 760 Wh/kg). The Zebra battery generally provides high cell voltage, high reliability, and adequate pulse power.

Special safety precautions and thermal management required for NaS and Zebra batteries prevent the utilization of the high energy densities theoretically possible. The high temperature (300 to 350° C.) required for operation of these sodium-based batteries also limits the selection of materials. Further, the required high temperature operation necessitates a cylindrical cell design due to high operating pressure, which reduces the packing density of such batteries compared to planar (e.g., rectangular) designs.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments provide secondary batteries comprising an alkali metal (e.g., sodium) at the anode and an electron conducting material at the cathode. Disclosed batteries also comprise an alkali ion conducting separator film, and anode and cathode side organic electrolytes. The cathode side electrolyte is selected to have capacity to dissolve metal ions from the alkali metal and electron conducting materials. An ion exchange reaction occurs during operation of the battery within the cathode side electrolyte.

A disclosed aspect believed to be unique is that the electrochemical reaction occurs in an electrolyte solution (cathode side electrolyte), instead of at the cathode. The cathode provides an electron-conducting medium, so there is no need for conversion or intercalation to occur at the cathode which traditional batteries are based on. When a disclosed battery referred to herein as an "alkali metal-cathode solution battery" is completely discharged, alkali ions only exist in the electrolyte solution, while when the battery is completely charged, ions from the electron conducting material ($Cu^{+2}$ (and/or $Cu^+$) ions in the case of copper metal) only exist in the electrolyte solution. The ion replacement reaction takes place in the organic cathode electrolyte during the charging and discharging process. In contrast for a traditional battery, the organic or non-aqueous solution provides conducting medium for ions, e.g., $Li^+$, $Na^+$, etc. from anode to cathode, and vice versa, no reactions occur in the electrolyte solution, and the necessary intercalation or conversion reaction occurs at the solid cathode surface.

Disclosed secondary alkali metal-cathode solution batteries provide high energy density battery and operate at low temperature <100° C., with zero (or near zero) self-discharge. Low temperature operation significantly enhances the safety of the battery compared to known sodium-based batteries that as noted above require high temperature (e.g., 300 to 350° C.) operation.

Copper metal as the cathode material in one embodiment is believed to create a unique battery chemistry with the alkali metal anode, providing both a high redox potential and a high energy density. Copper for the cathode is also benign and is thus safe. Moreover, copper being electrically conductive (unlike sulfur) requires no additional current collector material.

BRIEF DESCRIPTION OF THE DRAWINGS

FIG. 2 is a Table that includes a comparison of materials, operating parameters, safety and cost between a disclosed Na-Cu solution battery as compared to known NaS and Zebra batteries.

DETAILED DESCRIPTION

Figure 1:
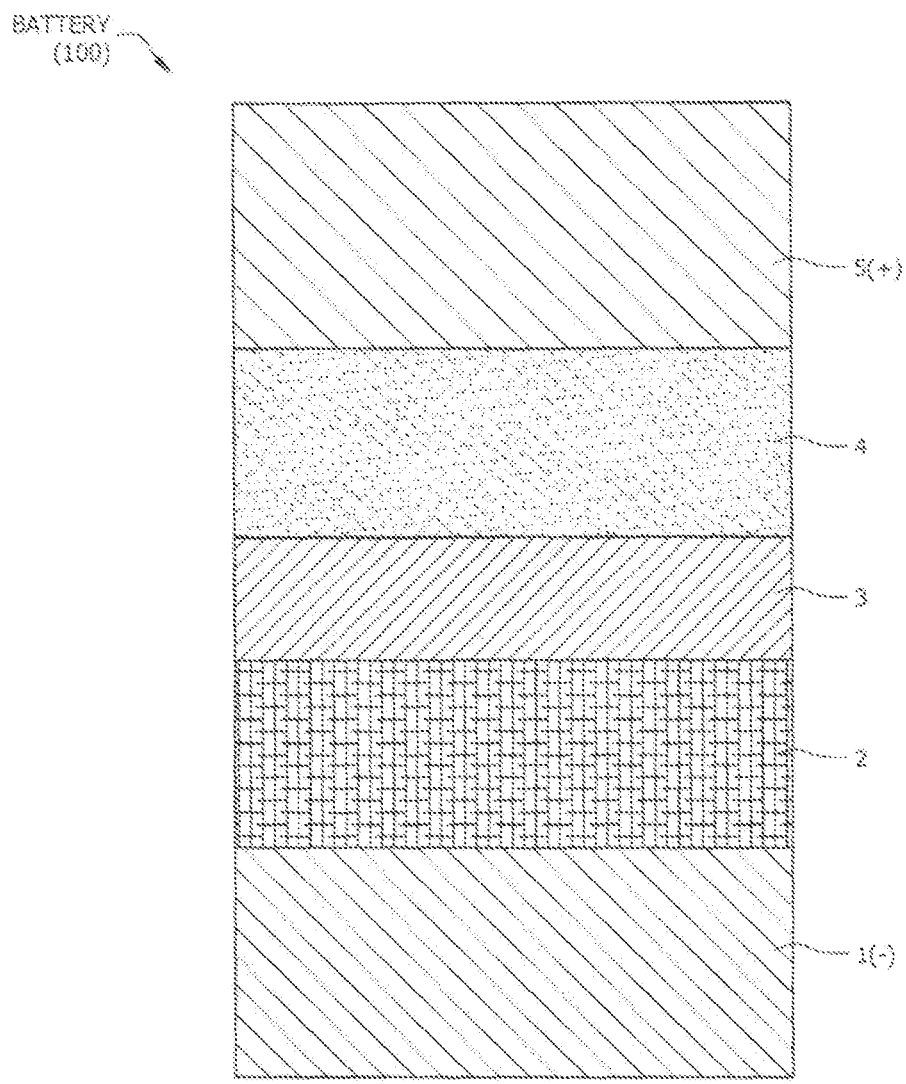
FIG. 1 is a schematic cross-sectional view of an alkali metal-cathode solution storage battery, according to an example embodiment.

Disclosed embodiments in this Disclosure are described with reference to the attached figures, wherein like reference numerals are used throughout the figures to designate similar or equivalent elements. The figures are not drawn to scale and they are provided merely to illustrate the disclosed embodiments. Several aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring structures or operations that are not well-known. This Disclosure is not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

FIG. 1 is schematic cross-sectional view of an alkali meta alkali solution storage battery (or storage cell) 100 according to an example embodiment. Battery 100 comprises an alkali metal anode (e.g., sodium) 1, a cathode 5 comprising an electron conducting material, and an alkali ion conducting separator film 3 that separates the anode 1 and cathode 5 positioned between an anode side electrolyte 2 and cathode side electrolyte 4. The electron conducting material can comprises iron, aluminum, nickel, or copper, where the electron conducting material is in atomic form, such as copper metal in the case of copper. "Copper metal" as used herein refers to a plurality of elemental copper atoms bound to one another, such as in the form of a rectangular sheet, as opposed to metal ions that are generally in solution, where the metal atoms have an equal number of positively charged protons and negatively charged electrons so that the total (net) charge for each metal atom is 0. The cathode 5 can also comprise porous carbon, such as in the form of mesoporous carbon with metal (e.g., iron, aluminum, nickel, or copper) in the pores.

The cathode 5 can be a essentially all electron conducting material (i.e., at least 99% copper by weight) or an alloy, such as in the case of copper comprising a minimum of 10% copper by weight, up to about 90% copper by weight. Example alloying metals include CuZn and CuAl. Significantly, battery 100 as shown in FIG. 1 is a planar (e.g., flat/rectangular) design due to its low temperature operation which allows high packing density compared to cylindrical designs needed for conventional higher operating temperature NaS and Zebra batteries as described above. Disclosed alkali metal-cathode solution batteries are generally "planar cells", which is a term of art referring to an electrical storage cell whose height is relatively short (small) as compared to its lateral dimension. The term "planar" is used herein to mean that the geometry of the cell is larger in lateral extent relative to its height, as compared with a cylindrical cell, and that the anode and cathode are both substantially planar. In a typical embodiment, the anode 1, the cathode 5 and the separator 3 all have substantially the same cross sectional area, defined herein as being within 10% of one another. Battery's 100 flat respective components can easily be stacked in a way that produces a much more compact battery as compared to cylindrical designs, making it an attractive option for large-scale energy storage, such as for use on the electrical grid. The anode, cathode, and separator all generally have substantially the same cross sectional area, defined herein as all being within 10% of one another.

The anode metal used for anode 1 can generally be any material which can accept and release electrons by the general formula shown below:

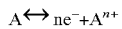

$$A \leftrightarrow ne^- + A^{n+}$$

where n is the stoichiometric coefficient of the electrochemical reaction, $e^-$ is the electron, and $A^{n+}$ is the oxidized form of the elemental metal. The anode material can comprise sodium, although other alkali metals such as lithium and potassium can also be used.

The anode side electrolyte 2 can comprise at least one salt of the alkali metal in the anode 1 together with at least one organic solvent. For example, the salt can be sodium perchlorate, sodium chloride, sodium nitrate, sodium hexafluorophosphate, or sodium sulfate. The organic solvent in the anode side electrolyte 2 can be propylene carbonate, ethylene carbonate, dimethylene carbonate, acetonitrile, dimethyle sulfoxide, and the like.

The separator film 3 in one embodiment can comprise β-sodium alumina, whose composition corresponds to the $Na_2OxAl_2O_3$, where x is in the range of 5-13. However, the separator film 3 can comprise other materials such as NASI-CON (NAtrium Super-Ionic CONductor), having the formula $Na_{1+x+4y}Zr_{2-y}Si_xP_{3-x}O_{12}$, where $1 \leq x \leq 3$ and $0 \leq y \leq 1$. In one embodiment, the separator film 3 is thin (typically 1 μm to 1,000 μm) for fast ionic transport therethrough during the charging/discharging cycles.

Cathode side electrolyte 4 can comprise an organic solvent such as propylene carbonate, ethylene carbonate, dimethylene carbonate, acetonitrile, or dimethyle sulfoxide. Organic solvents for the cathode side electrolyte 4 are generally selected which dissolve large amounts of metal salts (i.e. dissolve ions such as Na+ and $Cu^{+2}$ (or $Cu^+$)) for facile diffusion of ions in the solvents.

Operation of battery 100 is now described assuming the anode metal used for anode 1 is Na and the cathode 5 comprises copper metal. During the discharge process, $Na^+$ ions diffuse across anode side electrolyte 2 (e.g., nonaqueous electrolyte) and through separator film 3 to cathode side electrolyte 4 (e.g., organic electrolyte), where $Na^+$ ions exchange charge with the $Cu^+$ ions present in the cathode side electrolyte 4. The $Cu^+$ ion, which has a greater reduction tendency, then reacts in a reduction reaction with the electron which has traveled through external circuit (not shown) to form Cu metal on the surface of the copper cathode 5.

In accordance with one particular disclosed aspect the battery 100 employs sodium perchlorate salts, $NaClO_4$ in anode side electrolyte 2, and $CuClO_4$ in cathode side electrolyte 4, the electrochemical reaction in the battery 100 during discharge can be written as follows (where the respective potentials are at 25° C.):

Anode: $Na(s) \rightarrow Na^+ + e^-$  $E_A = 2.714$ V

Solid Electrolyte: $Na^+ \rightarrow Na^+$ (Na+ conduction from anode side to cathode side)

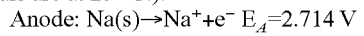

Organic Electrolyte (cathode side): $Na^+ + CuClO_4 \rightarrow NaClO_4 + Cu^+$

Cathode: $Cu^+ + e^- \rightarrow Cu(s)$ $E_C = 0.520$ V

Net: $Na(s) + CuClO_4 \rightarrow Cu(s) + NaClO_4$ $E_{CELL} = 3.234$ V

Battery 100 provides a relatively high cell 25° C. cell potential of 3.234V. This cell potential can be compared to known NaS and Zebra batteries, which as described below both have cell potentials (at their normal operating temperatures) of <2.6 V.

For the charging process of battery 100, the course of the reaction is reversed. Cu metal from cathode 5 is oxidized to $Cu^{2+}$ and electrons are released, which forces the $Na^+$ ions in the cathode side electrolyte 4 to diffuse back to the surface of the anode 1 to produce metallic sodium. The separator film 3 selectively conducts $Na^+$ ions and thus prevents mixing between the non-aqueous electrolytes 2 and 4.

FIG. 2 is a Table that includes a comparison of materials, operating parameters, safety, and cost between a disclosed Na-Cu solution battery and known NaS and Zebra batteries. The known NaS battery has a cell potential at an operating temperature of 350° C. of 1.74V to 2.08V. The known Zebra battery has a cell potential at an operating temperature of 300° C. of 2.59 V for a $NiCl_2$ cathode. For a disclosed sodium-copper solution battery the cell potential at 25° C. is 3.23V, and the capacity/specific energy density is 1,493 Wh/kg. Because of the planar design possible and the low temperature operation provided, the packing density (number of batteries) as compared to the NaS and Zebra batteries is considerably higher (~1.27×). The overall performance enhancement is about 4.7×, and safety issues are essentially eliminated.

Disclosed alkali metal-cathode solution batteries thus provide improved energy density over known sodium-based batteries, eliminate the need for thermal management enabled by low temperature operation, and eliminate safety problems through the use of benign copper metal cathode materials. Such batteries are particularly well suited to connection in series to deliver higher voltages, to form a series battery comprising a group of batteries. Disclosed batteries are suitable for battery systems such as for power storage systems, electric vehicles, emergency power supplies, uninterruptible power supplies, peak shift apparatus for electric power systems, and frequency-voltage stabilizers. Disclosed alkali metal-cathode solution batteries are also suitable for storing wind and solar power on the electric grid. In one power storage system embodiment, disclosed alkali metal-cathode solution batteries provide a large scale energy storage system having a capacity of ≥1 megawatt.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Thus, the breadth and scope of the subject matter provided in this Disclosure should not be limited by any of the above explicitly described embodiments. Rather, the scope of this Disclosure should be defined in accordance with the following claims and their equivalents.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. An alkali metal-cathode solution battery, comprising:
    an alkali metal anode including at least one alkali metal;
    a cathode comprising an electron conducting material;
    an alkali ion conducting electrolyte separator separating said anode and said cathode;
    an anode side electrolyte between said anode and said separator, and
    a cathode side electrolyte between said cathode and said separator,
    wherein said cathode side electrolyte has capacity to dissolve metal ions from said alkali metal and said electron conducting material,
    wherein an ion exchange reaction occurs during operation of said battery within said cathode side electrolyte, and
    wherein said alkali metal comprises sodium and said electron conducting material includes copper metal.

2. The battery of claim 1, wherein said electron conducting material comprises iron, aluminum, nickel, copper, or porous carbon including pores with metal in said pores.

3. The battery of claim 1, wherein said anode side electrolyte is a non-aqueous liquid electrolyte comprising at least one salt of said alkali metal and an organic solvent, and wherein said cathode side electrolyte is a non-aqueous liquid electrolyte that comprises an organic solvent.

4. The battery of claim 1, wherein said battery comprises a planar arrangement, and wherein said cathode and said anode are both substantially planar.

5. The battery of claim 3, wherein said anode, said cathode, and said separator have substantially the same cross sectional area.

6. The battery of claim 1, wherein said cathode includes >99 weight % of said copper metal.

7. The battery of claim 1, wherein said cathode comprises a copper alloy including at least one alloying metal and 10 to 90 weight % of said copper metal.

8. An alkali metal-cathode solution battery storage, comprising:
    an alkali metal anode including sodium metal;
    a cathode comprising copper metal;
    a solid alkali ion conducting electrolyte separator separating said anode and said cathode;
    an anode side electrolyte comprising a non-aqueous liquid electrolyte comprising at least one salt of said alkali metal and an organic solvent between said anode and said separator, and
    a cathode side electrolyte comprising a non-aqueous liquid electrolyte that comprises an organic solvent between said cathode and said separator,
        wherein said cathode side electrolyte has capacity to dissolve sodium ions and copper ions; and
    wherein an ion exchange reaction occurs during operation of said battery within said cathode side electrolyte.

9. The battery of claim 8, wherein said battery comprises a planar arrangement, and wherein said cathode and said anode are both substantially planar.

10. The battery of claim 8, wherein said anode, said cathode and said separator have substantially the same cross sectional area.

11. The battery of claim 8, wherein said alkali metal comprises sodium.

12. The battery of claim 11, wherein said cathode includes >99 weight % of said copper metal.

* * * * *